United States Patent [19]
Surgarek

[11] Patent Number: 5,984,197
[45] Date of Patent: Nov. 16, 1999

[54] THERMOSTAT

[75] Inventor: Alan Surgarek, Houston, Tex.

[73] Assignee: C. Alan Sugarek, Houston, Tex.

[21] Appl. No.: 09/002,076

[22] Filed: Feb. 12, 1998

[51] Int. Cl.$^6$ .................................................. G65D 23/12
[52] U.S. Cl. ................. 236/93 A; 236/100; 236/DIG. 2; 60/527
[58] Field of Search ................. 236/93 A, 100, 236/99 K, DIG. 2; 60/527

[56] References Cited

U.S. PATENT DOCUMENTS

| | | | |
|---|---|---|---|
| 2,774,539 | 12/1956 | Eskin ..................................... | 236/99 K |
| 2,966,062 | 12/1960 | Eskin et al. ................................ | 60/527 |
| 3,001,401 | 9/1961 | Vernet et al. ............................... | 60/527 |
| 3,591,075 | 7/1971 | Onishi ....................................... | 236/34 |
| 4,032,067 | 6/1977 | Hanaoka .................................. | 236/34.5 |
| 4,441,317 | 4/1984 | Wolfe et al. ............................... | 60/527 |
| 5,381,192 | 1/1995 | Duprez ................................... | 236/34.5 |

*Primary Examiner*—William E. Tapolcai
*Attorney, Agent, or Firm*—Locke Liddell & Sapp LLP

[57] ABSTRACT

The invention is a thermostat for a cooling system comprising a valve member configured to be positioned in a valve port in the cooling system. The valve member is configured to impede or prevent a flow of a thermal conducting medium into or out of the valve port. A thermally responsive actuator is coupled to the valve member to move the valve member into and out of a position that impedes or prohibits the flow of the thermal conducting medium into or out of the valve port. The thermally responsive actuator comprises at least one flexible plate for applying a thermally generated motion to the valve member.

16 Claims, 4 Drawing Sheets

THERMOSTAT

BACKGROUND AND SUMMARY OF THE INVENTION

The present invention relates to a thermostat valve that utilizes the reversible expansion and contraction of a thermally expandable material, as typically used in internal combustion engines.

Bimetal and bellows type thermostats were originally employed in low pressure/low temperature applications. With the growing use of pressurized cooling systems, designed to raise the boiling point of the cooling fluid, thermostats employing an "incompressible" thermally responsive material, such as wax or a wax—metal mixture, have come into wider use.

The mechanics of the conventional wax-pellet thermostat are well known, as illustrated by U.S. Pat. No. 3,591,075 by Oaishi. The thermostat is placed in the coolant outlet, so that the wax containing reservoir rests in the engine block coolant. When the engine is cool a spring ensures that the valve member maintains contact with the valve seat, blocking coolant flow from the engine to the cooling reservoir (typically the cooling radiator for land vehicles or the body of water for marine use). As the engine warms, the wax within a soft elastic bladder is heated and expands. This produces a force against a piston in contact with the valve member. When the coolant temperature reaches a predetermined level, the force of the bladder on the piston overcomes the spring force joining the valve member and valve seat. The valve member and valve seal separate, allowing cooling fluid to flow. As the temperature continues to rise, the wax continues to expand, and the valve continues to open until steady state is reached or the piston full stroke is reached.

Shortcomings of this thermostat are well documented. Oftentimes the container for the wax material leaks or otherwise fails. This causes the thermostat to remain closed, eventually resulting in engine overheating. The piston is also subject to sticking or hanging up, usually in the closed or fully open position. The former will result in an overheated engine, while the latter will cause poor engine performance, excessive exhaust, and again overheating if the increased heat transfer from the radiator to the environment is inadequate, thus resulting in heat build up in the reservoir.

Numerous improvements to the basic design exist that improve the functionality of the thermostat. One improvement employs a casing member, containing a thermally responsive material acting on a piston member which slides through a cylindrical guide, that is either machined with tight clearances or employs a seal to allow the piston to repeatedly axially translate from the closed to open position. However, this improvement involves more parts, which increases both the probability of any one part failing and the cost of manufacturing.

Another drawback to this design is that it promotes piston sticking or bladder wear, since one end terminates at the wax bladder, while the other end is open to the cooling fluid forming a "dead leg", a place where contaminants and debris tend to accumulate. Contaminants can also enter the pellet area causing bladder wear, particularly in cold temperatures.

Most of the present art employs a separate spring member to ensure that the thermostat is biased in the closed position. This usually results in an engine overheat upon failure. This design also suffers the same shortcomings regarding the additional parts involved, namely the increased probability of the failure of any single component and the increased manufacturing cost.

Several alternatives to alleviate this shortcoming have been developed, such as U.S. Pat. No. 5,381,952 by Duprez. Duprez reveals a thermostat designed to fail in the opening position. This design reveals the basic wax thermostat design discussed above with an added spring to force the thermostat into an open position upon failure of the thermostat. This design employs added complexity and parts, both which adversely affect the probability single component failure and added manufacturing cost.

Other solutions have been employed, such as redundant thermostat valves or manufacturing the thermostat incorporating fusible elements. However, both these solutions adversely impact manufacturing cost.

Additionally, the redundant valve is typically sized to provide only enough coolant flow to allow the engine to operate under no-load conditions. Thus, the net effect is to save the engine, but strand the operator with an engine that cannot perform.

The latter method, employing fusible members in the construction of the thermostat, typically requires exotic materials and is slow to react. Other factors besides temperature also promote failure, such as cycle fatigue. In the event that the fusible member works as designed, the valve fails completely open, with all the cooling fluid going through the cooling reservoir with the same results of a stuck open thermostat described previously.

The present invention solves the problems present in the field. First, the invention provides a reliable thermostat with fewer parts. Further, the present invention minimizes the number of moving parts. Thirdly, the invention provides a reliable thermostat without a fluid "dead leg" where contaminants and debris tend to accumulate. In addition, the present invention fails in the open position, and can be designed to fail open in a preset prescribed position. Lastly, the invention is a simple design and can be easily fabricated or assembled, thus saving manufacturing costs.

The invention consists of a reservoir containing a thermally expandable material. The base of the reservoir is a resilient flexible plate. A stem connects the resilient flexible plate to a valve seal which acts as a closure for a valve port.

In the cooled state, the expandable material occupies the whole of the volume of the reservoir. In the unheated state, the plate is biased concavely inward towards the reservoir volume. Thus, in the unheated state, the valve member is seated against the valve seal and blocking the valve port.

When heated, the material expands and exerts pressure against the resilient plate. This force operates to bend the plate away from the reservoir and drive the stem outwards. This serves to free the valve seal from the valve opening and thus allowing coolant to circulate through the valve opening.

If the reservoir should develop a leak, a neutral pressure would occur in the reservoir relative to the operating environment. Thus, the plate would naturally straighten, forcing the stem outwards. The valve would then be placed in a predetermined open position, allowing a predictable flow of coolant through the opening when being operated.

DESCRIPTION OF THE PREFERRED EMBODIMENT

Figure 1:
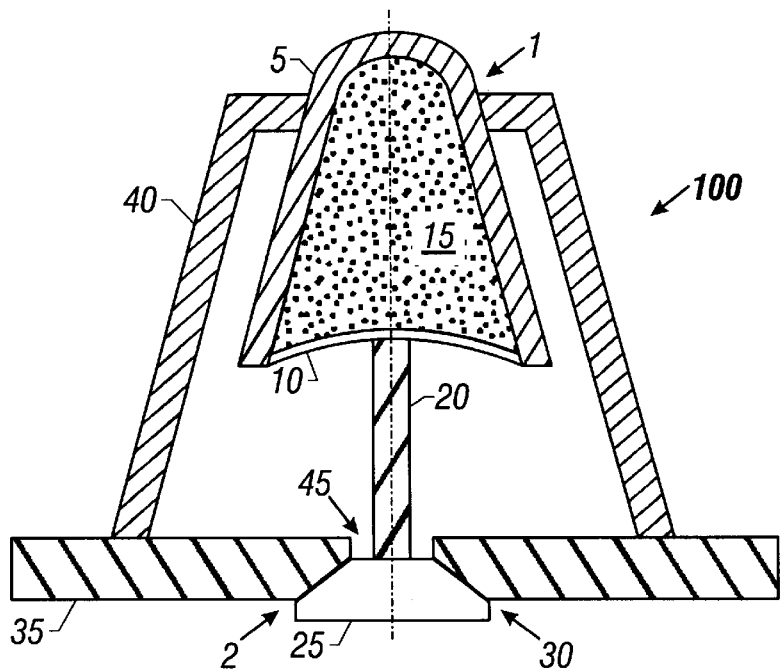
FIG. 1 is a vertical section of the central part of one embodiment of the invention with the valve in a closed position.

An embodiment of the present invention is illustrated in FIG. 1.

The invention comprises a thermally responsive actuator 100 further comprised of a resilient flexible plate 10. Preferably, the thermally responsive actuator 100 comprises a reservoir 1 comprised of a thermally conductive casing 5 and a resilient flexible plate 10, enclosing a volume. This volume contains a thermally expandable material 15, such as wax, a wax-metal mixture, or any other thermally expansive material.

Preferably, the thermally expandable material 15 completely fills the volume, and the thermally expandable material is preferably incompressible in nature. Thus, as the heat is added to the thermally expandable material, the full expansive force of the thermally expandable material is applied to the casing 5 and flexible plate 10.

Alternatively, the thermally expandable material is hermetically sealed in reservoir 1 under a partial vacuum. The reservoir is sealed at a partial vacuum preferably above the vapor pressure of thermally expandable material 15 in order to maintain the concavity of the flexible plate 10 in the cooled state.

Figure 2:
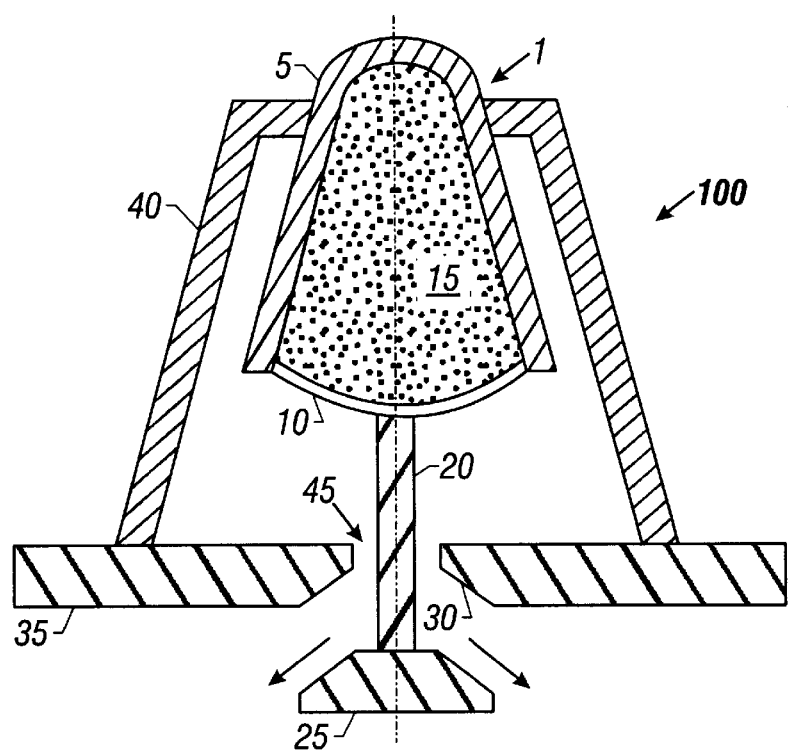
FIG. 2 is a vertical section of the central part of the invention depicted in FIG. 1 with the valve in an open position.

A stem 20 is attached to flexible plate 10 and communicates with valve member 25. Valve member 25 cooperates with valve seat 30 to initiate or increase flow (open valve), as illustrated in FIG. 2, or stop flow (closed valve), as illustrated in FIG. 1, when valve member 25 and valve seat 30 are seated against one another and blocking valve port 45.

Together valve member 25 and valve seat 30 comprise thermostat valve 2. Housing 35 is adapted to be secured within a cooling fluid conduit (not shown) and comprises valve seat 30 and position support 40. Position support 40 is an open frame which maintains the position and alignment of the reservoir 1, stem 20, and valve member 25 relative to the valve seat 30, both in the closed and open positions, as illustrated respectively in FIGS. 1 and 2, or any intermediate position. It should be noted that position support 40 may be facilitated in aligning stem 20 and valve member 25 by other aligners, including valve or stem guides, tapered components, sleeves, cylinders, or open housings. Such aligners may assist positioning support 40 in maintaining alignment and enhance performance, and may comprise positioning support 40.

In the preferred embodiment, reservoir 1 is comprised of one or more elastic materials, such as metals, in order to minimize the stresses on flexible plate 10, or other parts of the reservoir 1 influenced by the flexible plate 10. This is preferred as it may repeatedly flex between positions under the thermal, vacuum, pressure, and fluid stresses that may be encountered in an engine cooling system.

Similarly, the construction of all the structural members of an elastic material enhances closure and reduces thermal and pressure related stresses. The use of elastic materials with similar thermal expansion coefficients assist position support 40 maintain alignment through varying temperatures.

In the preferred embodiment, flexible plate 10 is initially biased in a concave position from its neutral, no-load (flat) position. That is, flexible plate 10 bends inward towards the reservoir. However, it should be noted that depending upon the intended fail position, the plate may be initially biased either in a neutral or convex position.

In the preferred embodiment, flexible plate 10 is maintained in the concave position in the cooled state by forces initially imposed on reservoir 1. Multiple considerations determine the amount of biasing concavity, including but not limited to the following: the elasticity of reservoir 1 material, stresses and deflections on reservoir 1, the desired valve member 25 position in the event of failure (illustrated in FIG. 3), provisions for additional concavity or deformation upon encountering colder temperatures, total stroke length and anticipated stresses imposed from fully closed to fully open position, and the physical properties of heat expandable material 15 contained within. The amount of concavity of biased flexible plate 10, coupled with stem 20 length, also dictate the preload closing force imposed by valve member 25 on valve seat 30.

In the preferred embodiment, heat expandable material 15 is hermetically sealed in a partial vacuum, that is above its vapor pressure, thereby minimizing the influence of pressure forces and ensuring closure. Closure is further enhanced by providing adequate flexible plate 10 area (normal to axial stem 20) to allow fluid pressures on flexible plate 10 to overcome the fluid forces acting on valve member 25, upon the introduction of a flowing and/or pressurized thermal conducting medium.

When reservoir 1 is subjected to a lower temperature, elasticity in flexible plate 10 for additional concavity combined with elasticity in the other thermostat members, particularly the components comprising thermostat valve 2, allows for any additional contraction of heat expandable material 15. If necessary, travel stops are employed to limit this cold stroke length. When reservoir 1 is subjected to higher temperatures, heat energy is transferred through a thermally conductive surface of reservoir 1, such as casing 5 or flexible plate 10. Expandable material 15 will expand in response to the introduction of the heat energy and exert force on casing 5 and flexible plate 10. This force reduces the concavity of the flexible plate 10, moving stem 20 toward the open position. Coupled with the elasticity of the components, this movement of stem 20 reduces the closing force of valve member 25 on valve seat 30. At a predetermined temperature of heat expandable material 15, and thus a predetermined force translated through moving stem 20, valve member 25 separates from valve seat 30 exposing valve port 45. This allows thermal conducting medium flow through now opened valve port 45.

It should be noted that the initial bias of flexible plate 10 may be in the neutral, flat position, or it may be in a convex bias. Nevertheless, the principle is the same, since the expansion of heat expandable material 15 tends to exert a force on flexible plate 10. This force serves to move stem 20, and attached valve member 25 would then be moved away from valve seat 30, thus opening valve port 45.

As reservoir 1 is subjected to higher temperatures, heat expandable material 15 will expand further, reducing the concavity of flexible plate 10, moving stem 20, moving valve member 25 away from valve seat 30, exposing more of valve port 45, and thus increasing flow of a thermal conducting medium through valve port 45.

In one embodiment, shown in FIG. 2, if reservoir 1 is subjected to enough temperature, flexible plate 10 could be forced through the neutral (flat) position to a convex position, as illustrated in FIG. 2.

Figure 3:
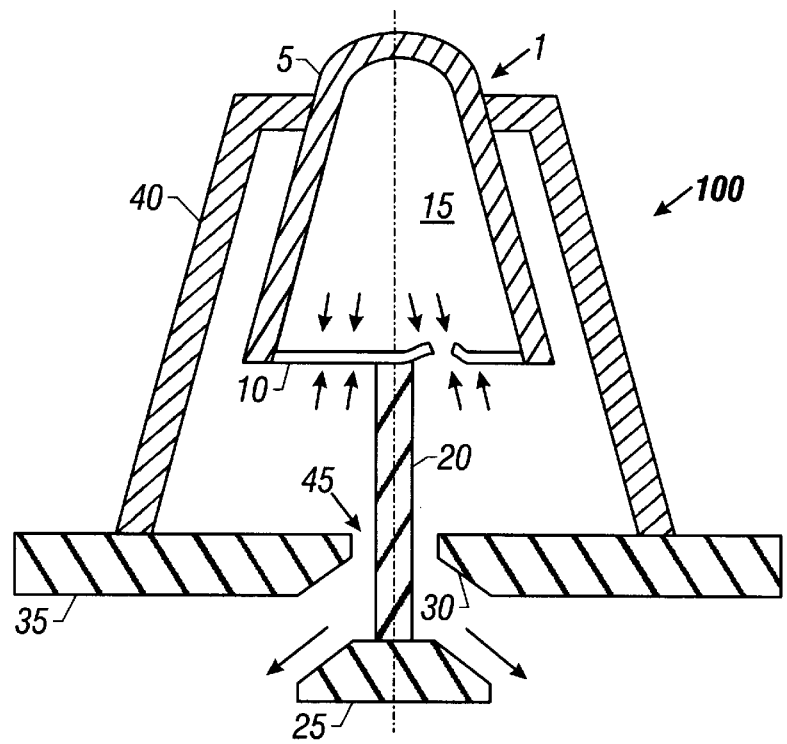
FIG. 3 is a vertical section of the central part of the invention illustrating the selectively open valve position in the event of reservoir failure.

In the event that a leak develops in reservoir 1, the pressure on either side of flexible plate 10 tends to equalize. The equalization allows flexible plate 10 to lose the concave bias and thereby allowing flexible plate 10 to attain the neutral position. In the preferred embodiment this opens thermostat valve 2, as illustrated in FIG. 3. Thus, in the preferred embodiment, when reservoir 1 fails, the invention will fail in an open position and will allow thermal conducting fluid to continue to circulate. It should be noted that this feature may be designed where the flow of thermal conducting medium is impeded, or is not impeded, through a port, depending upon the position desired upon failure.

Figure 4:
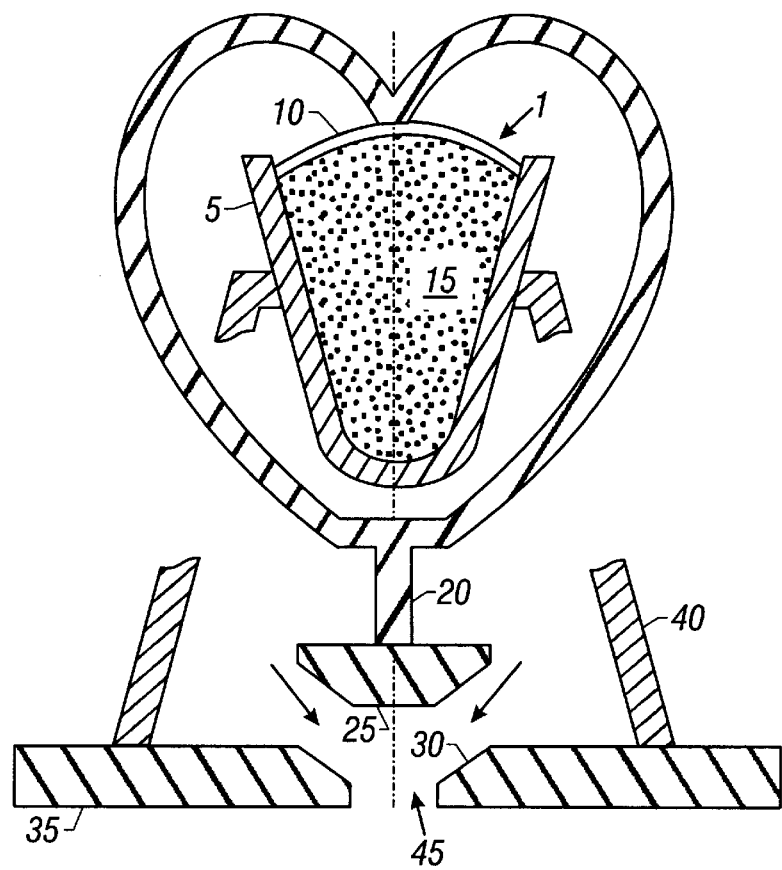
FIG. 4 is a vertical section of the central part of another embodiment of the invention with the valve open.

FIG. 4 illustrates another embodiment of the present invention where valve member 25 travels upstream to open. One advantage of this embodiment is that closure force is more easily attained since net fluid forces act toward closure. Adequate force provided through the bias of flexible plate 10 must be provided to overcome closing forces on valve member 25 to ensure fail safe operation.

Figure 5:
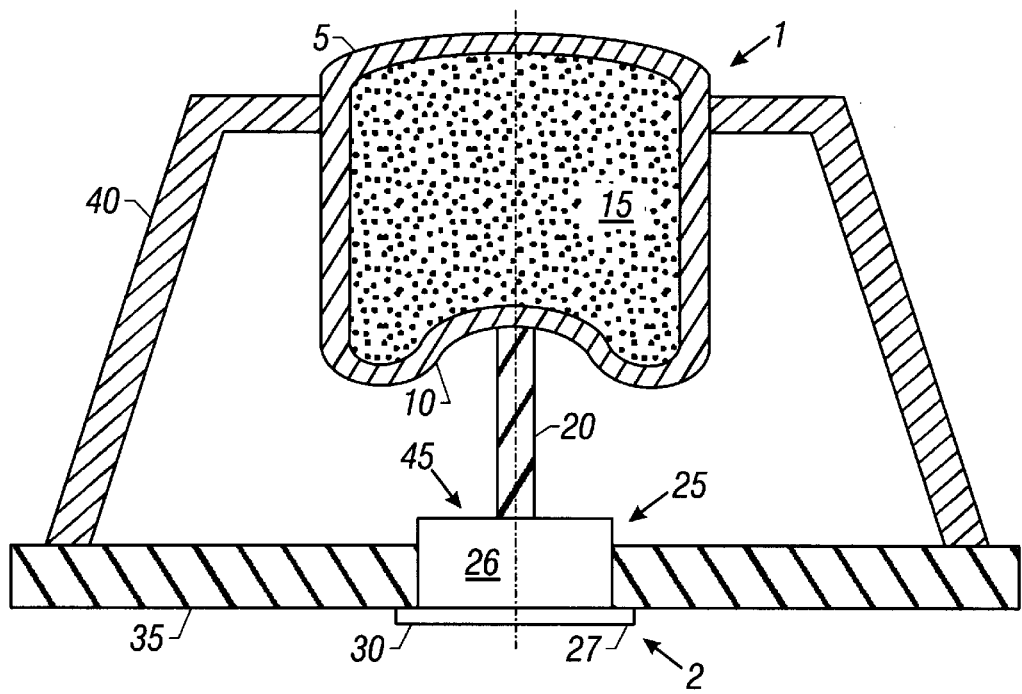
FIG. 5 is a vertical section of the central part of the invention.
Figure 6:
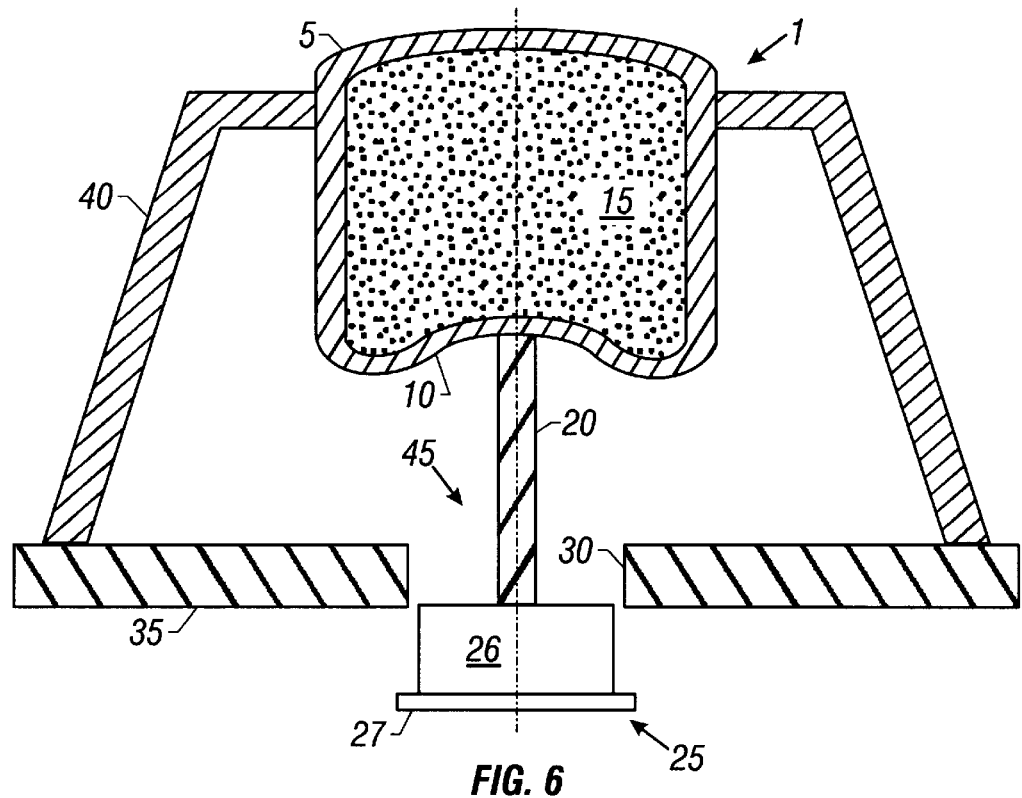
FIG. 6 is a vertical section of the central part of the invention illustrating the valve at the point of transition to allow or disallow flow.

FIG. 5 illustrates another preferred embodiment of the thermostat featuring a "deadband" design. The design of the valve member 25 comprises a slidable plug 26, which fills the port 45 defined by the valve seat 30, and lip 27. This plug 26 provides closure as detailed previously. The thickness of the slidable plug 26 determines the amount of "deadband" in thermostat valve 2, that is the transitory range of valve member positions between the point where lip 27 loses contact with valve seat 30 and the point where slidable plug 26 of valve member 25 vacates the port defined by valve seat 30 to allow fluid flow, as illustrated in FIG. 6.

Figure 7:
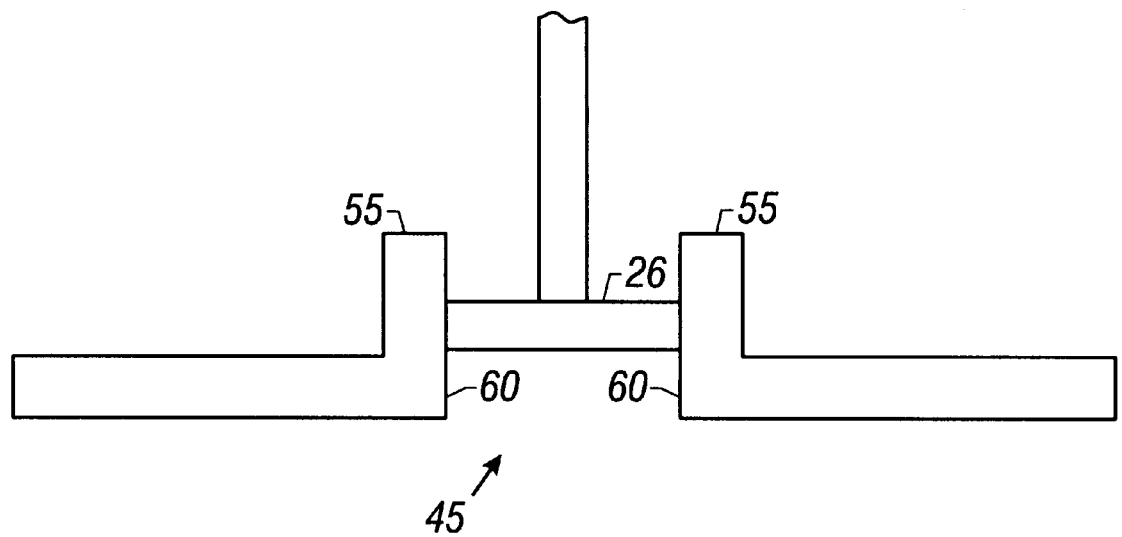
FIG. 7 is a vertical section of the invention showing the "deadband" feature in walls around the port.

Another embodiment of the "deadband" feature is illustrated in FIG. 7. There, the "deadband" is effected with the placement of a hollow cylinder 55 around port 45. Valve member 25 is pushed down through the cylinder during the heating process. Thus, cylinder walls 60 around port 45 act as the "deadband", rather than the thickness of the slidable plug 26.

Figure 8:
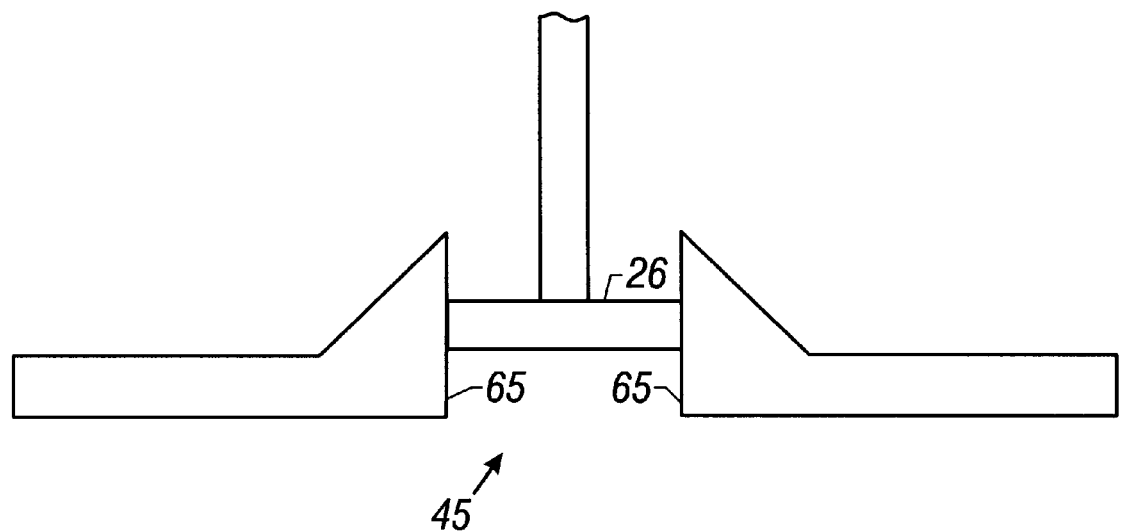
FIG. 8 is an alternative embodiment of the deadband feature of FIG. 7.

In another embodiment of the "deadband", illustrated in FIG. 8, the walls around port 45 are gradually built up. This built up area around the port produces the port walls 65, which serve the same function as walls 60 in FIG. 7. This produces a "deadband" in the walls of port 45 rather than in increasing the thickness of slidable plug 26.

The point at which cooling fluid begins to flow correlates with a specific position of valve member 25, stem 20, and flexible plate 10, which is in turn governed by the volume of heat expandable material 15, which in turn is controlled by temperature of the thermal conducting medium enveloping reservoir 1. Hence, thermal conducting medium flow is initiated (or terminated) at a prescribed temperature.

Practical considerations determine the design and materials of construction of valve member 25, valve port 45 defined by valve seat 30, and the clearances and interaction between the two. For instance, if a small amount of cooling fluid is tolerable during the transitory period, this may preclude the use of soft seals, soft seats, or tight clearances. Thus valve member 25 could be comprised of a single material, such as metal, to reduce costs of construction, allow for contaminants, allow for thermal expansion, and reduce wear.

Similarly if tight closure is not warranted at any time, the omission of lip 27 may be deleted, thereby again reducing construction costs and allowing more axial movement of stem 20, flexible plate 10, and valve member 25 during cold conditions. Various stops can be employed to directly or indirectly restrict the amount valve member 25 may travel in either axial direction, thereby limiting the amount of cooling flow in the open position and preventing overstress due to excessive closure forces on reservoir 1, stem 20, valve member 25, or housing 30 during cold conditions.

Various reservoir 1 shapes and designs can be employed to increase heat transfer 20 and/or strength, such as dimples, fins, walls, or partitions. Flexible plate 10, though shown as a separate member, can also be an integral part of the casing 5, thereby eliminating or relocating the joint between the components of reservoir components. The materials or design of flexible plate 10 or stem 20 can be modified to minimize loading at this joint if warranted.

It should also be noted that the present invention is easily modified to be double acting. That means movement to open one port will simultaneously initiate closure of another port, such as a bypass port. Therefore, the thermally responsive actuator both opens the valve port and closes a second valve port.

Various modifications may be made in the nature, composition, operation and arrangement of the various elements, steps and procedures described herein without departing from the spirit and scope of the invention as defined in the following claims.

What is claimed is:

1. A thermostat for a cooling system comprising:
   a valve member configured to be positioned in a valve port in the cooling system, the valve member configured to impede a flow of a thermal conducting medium through the valve port;
   a thermally responsive actuator coupled to the valve member to move the valve member into and out of a position indicative of impeding the flow of a thermal conducting medium through the valve port, and wherein the thermally responsive actuator comprises
      at least one flexible plate for applying a thermally generated motion to the valve member, and wherein the flexible plate has an initial bias;
      a reservoir enclosing a volume, and wherein the reservoir further comprises at least one thermally conductive surface for conducting heat from the thermal conducting medium to the enclosed volume; and
   a heat expandable material contained within the reservoir, and wherein the heat expandable material is hermetically sealed in at least a partial vacuum within the reservoir.

2. The thermostat of claim 1 wherein heat energy is transferred from the thermal conducting medium to the heat expandable material, and wherein the heat expandable material expands within the reservoir in response to the heat energy and exerts a pushing force at least partly on the flexible plate, and wherein the flexible plate moves inward or outward in response to the pushing force.

3. The thermostat of claim 1 wherein the heat expandable material has a vapor pressure, and the heat expandable material is sealed in the reservoir at a pressure above the vapor pressure of the heat expandable material.

4. The thermostat of claim 1 wherein at least a portion of the flexible plate is initially concavely biased with respect to the reservoir.

5. The thermostat of claim 1 wherein the flexible plate is initially biased flat with respect to the reservoir.

6. The thermostat of claim 1 wherein the initially biased flexible plate is indicative of the valve member being in a position whereby the flow of the thermal conducting medium through the valve port is impeded.

7. The thermostat of claim 1 wherein the initially biased flexible plate is indicative of the valve member being in a position whereby the flow of the thermal conducting medium through the valve port is not impeded.

8. The thermostat of claim 1, whereby upon failure of the reservoir, the initially biased flexible plate moves to a position.

9. The thermostat of claim 8, whereby the resulting valve member position does not impede the flow of the thermal conducting medium through the valve port.

10. The thermostat of claim 8, whereby the resulting valve member position impedes the flow of the thermal conducting medium through the valve port.

11. The thermostat of claim 2 wherein the thermally responsive actuator includes a stem, the stem coupling the valve member and the flexible plate, whereby the stem transmits movements of the flexible plate to the valve member.

12. The thermostat of claim 1 further comprising an aligner for positioning the valve member accurately to a position indicative of impeding the flow of the thermal medium through the valve port.

13. The thermostat of claim 1 wherein the valve member further comprises a deadband mechanism, wherein a transitory value of the valve member position is indicative of impeding the flow of the thermal medium through the valve port for a range of thermal condition.

14. The thermostat of claim 13 wherein the deadband mechanism is a solid plug.

15. The thermostat of claim 13 wherein the deadband mechanism is effectuated by a wall around the valve port.

16. The thermostat of claim 1 wherein the thermally responsive actuator both opens the valve port and closes a second valve port.

* * * * *

UNITED STATES PATENT AND TRADEMARK OFFICE
CERTIFICATE OF CORRECTION

PATENT NO : 5,984,197
DATED : November 16, 1999
INVENTOR(S): C. Alan Sugarek

It is certified that error appears in the above-identified patent and that said Letters Patent are hereby corrected as shown below:

The name of the inventor is incorrectly written "Alan Surgarek." Instead, it should read "C. Alan Sugarek."

The patent incorrectly names C. Alan Sugarek as the assignee. The patent should correctly name no assignee; thus, the assignee line should be blank.

Signed and Sealed this

Twenty-second Day of May, 2001

*Attest:*

NICHOLAS P. GODICI

*Attesting Officer*     *Acting Director of the United States Patent and Trademark Office*